(12) United States Patent
Torriano et al.

(10) Patent No.: US 12,298,163 B2
(45) Date of Patent: May 13, 2025

(54) ELECTRONIC HEAT BALANCE FLOW METER

(71) Applicant: HYDRO-QUÉBEC, Montréal (CA)

(72) Inventors: Federico Torriano, Boucherville (CA); Kevin Venne, Brewerton, NY (US); Luc Provencher, Contrecoeur (CA); Mathieu Kirouac, Saint-Bruno (CA); Laurent Mydlarski, Dollard-des-Ormeaux (CA)

(73) Assignee: HYDRO-QUÉBEC, Montreal (CA)

( * ) Notice: Subject to any disclaimer, the term of this patent is extended or adjusted under 35 U.S.C. 154(b) by 177 days.

(21) Appl. No.: 18/258,679

(22) PCT Filed: Dec. 17, 2021

(86) PCT No.: PCT/CA2021/051831
§ 371 (c)(1),
(2) Date: Jun. 21, 2023

(87) PCT Pub. No.: WO2022/133584
PCT Pub. Date: Jun. 30, 2022

(65) Prior Publication Data
US 2024/0044685 A1  Feb. 8, 2024

(30) Foreign Application Priority Data
Dec. 21, 2020 (CA) .................. CA 3103598

(51) Int. Cl.
*G01F 1/69* (2006.01)
*G01F 1/698* (2006.01)
*G01F 25/10* (2022.01)

(52) U.S. Cl.
CPC .............. *G01F 1/69* (2013.01); *G01F 1/698* (2013.01); *G01F 25/10* (2022.01)

(58) Field of Classification Search
CPC . G01F 1/69; G01F 1/698; G01F 25/10; G01F 1/688; G01F 1/684; F24F 2110/30
See application file for complete search history.

(56) References Cited

U.S. PATENT DOCUMENTS 4,107,525 A   8/1978  Hart, Jr.
4,304,129 A  12/1981  Kawai et al.
(Continued)

FOREIGN PATENT DOCUMENTS

CA    1207408    7/1986
CA    2018272   10/1996
(Continued)

OTHER PUBLICATIONS

Venne et al., "Design of a thermal mass flow meter for measurement within the rotor rim ducts of a hydroelectric generator", ASME 2018 5th Joint US-European Fluids Engineering Summer Conference, Montreal, Jul. 2018.
(Continued)

*Primary Examiner* — Francis C Gray
(74) *Attorney, Agent, or Firm* — Womble Bond Dickinson (US) LLP

(57) ABSTRACT

A thermal mass flowmeter is provided to determine the air flow in a vent. The flowmeter includes a duct defined by printed circuit boards and adapted to insert in the vent. The flowmeter also includes a heating element located across the duct, for heating the air passing through the duct. At least one thermal sensor is located in the duct upstream from the heating element, relative to air flow, to measure inlet temperature of the air. At least one other thermal sensor is located in the duct downstream from the heating element, to measure outlet temperature heated by the heating element. The flowmeter further includes a support member to maintain the structural integrity of the duct within the vent, and
(Continued)

at least one connector to exchange electrical signals with the flowmeter.

21 Claims, 14 Drawing Sheets

(56) References Cited

U.S. PATENT DOCUMENTS

| | | | |
|---|---|---|---|
| 4,685,331 A | | 8/1987 | Renken et al. |
| 4,876,887 A | | 10/1989 | Mickler |
| 5,792,952 A | | 8/1998 | Ritchart |
| 5,861,556 A | * | 1/1999 | Nukui .................. G01F 1/3209 73/204.17 |
| 7,054,767 B2 | | 5/2006 | Eldridge |
| 7,444,863 B2 | | 11/2008 | Sakai |
| 2015/0082879 A1 | * | 3/2015 | Graff ....................... G01F 1/684 73/204.25 |
| 2016/0178421 A1 | | 6/2016 | Matsumoto et al. |
| 2016/0216144 A1 | | 7/2016 | Figi et al. |
| 2016/0238421 A1 | * | 8/2016 | Kurata ....................... G01F 5/00 |
| 2020/0166394 A1 | | 5/2020 | Gaberthuel |
| 2021/0055145 A1 | | 2/2021 | Grun et al. |

FOREIGN PATENT DOCUMENTS

| | | | |
|---|---|---|---|
| CA | 2044655 | | 12/2001 |
| CA | 2496204 | | 5/2014 |
| CA | 3069848 | | 3/2022 |
| CA | 3037353 | | 12/2022 |
| CN | 207751540 | | 8/2018 |
| CN | 209296066 | | 8/2019 |
| CN | 209656113 | | 11/2019 |
| CN | 209910745 | | 1/2020 |
| CN | 210141911 | | 3/2020 |
| EP | 1342909 B1 | | 2/2013 |
| FR | 3073275 | | 5/2019 |
| GB | 2039051 A | | 7/1980 |
| KR | 1446464 B1 | * | 10/2014 ............... B60H 1/34 |
| WO | WO-2015022156 A1 | * | 2/2015 ........... G01F 1/6845 |

OTHER PUBLICATIONS

Venne, "Design of an anemometer to characterize the flow in the rotor rim ducts of a hydroelectric generator", Thesis submitted for degree of Master of Engineering, Department of Mechanical Engineering, McGill University, Montréal, Québec, Canada, 2017.

Kirouac, "Technical Report: On-Board System for Measurement of Mass Flow in the Rims of a Network Alternator Rotor", Internship Report, Department of Mechanical Engineering, University of Sherbrooke, Quebec, Canada, 2017.

Hosseinzadeh Chaboki et al., "Experimental and simulation studies of the effect of restrictor and distributor on the performance of thermal mass flow meter", Journal of Measurement (119), pp. 259-264, 2018.

Horning et al., "Design of a low-cost thermal dispersion mass air flow sensor", Journal of Sensing and Imaging (19), 2018.

Adamec et al., "Self Heated Thermo-Resistive Element Hot Wire Anemometer", IEEE Sensors Journal (10) pp. 847-848, 2010.

Mailly et al., "Anemometer with hot platinum thin film", Journal of Sensors and Actuators (94), pp. 32-38, 2001.

Glatzl et al., "Characterization and Optimization of a Thermal Flow Sensor on Circuit Board Level", Proceedings of the 19th IEEE International Conference on Emerging Technology and Factory Automation (ETFA), IEEE (2014), Sep. 19, 2014 (Sep. 19, 2014), Barcelona, Spain, pp. 1-7.

International Search Report for international application No. PCT/CA2021/051831, mailed on Feb. 2, 2022.

* cited by examiner

ELECTRONIC HEAT BALANCE FLOW METER

TECHNICAL FIELD

The technical field generally relates to anemometry, and more particularly to measuring an air flow through a ventilation duct.

BACKGROUND

Several systems and methods exist for generating electric power that is necessary to modern life. Generally, a hydroelectric generator is set in motion by one of various means to generate said electric power. A typical hydroelectric generator includes a stator and a rotor, with the rotor moving relative to the stator. This movement of the rotor relative to the stator generates electric power.

The conversion of mechanical kinetic energy to electric energy is not a perfectly efficient process resulting in energy loss in the form of heat within the hydroelectric generator. This heat should preferably be removed from the system, as excessive temperatures can accelerate the degradation of critical components and thus shorten the useful life of hydroelectric generators.

To dissipate the heat generated by the system, the rotor rim of a hydroelectric generator can include a number of vents as well as a ventilation and cooling system. The ventilation system forces air through the rotor rim vents toward the rotor poles, thereby favoring convective cooling.

There is a need for a system and device adapted to measure the air flow in a vent of a hydroelectric generator, to determine whether the air flow is sufficient. Such a system and device would help ensure that ventilation systems are properly operating and help preventing potential damages to hydroelectric generators in the event of a malfunctioning cooling system.

SUMMARY

According to a first aspect, an electronic thermal mass flowmeter is included to determine an air flow through a vent. The flowmeter includes printed circuit boards defining a duct adapted to be inserted into the vent. The flowmeter further includes a heating element located across the duct, adapted to heat air passing through the duct, the heating element extending from a first to a second of the printed circuit boards opposite the first of the printed circuit boards, a first thermal sensor located upstream from the heating element relative to the air flow and adapted to measure an inlet temperature of the air and a second thermal sensor located downstream from the heating element relative to the air flow and adapted to measure an outlet temperature of the air. The flowmeter also includes at least one connector adapted to transmit electrical signals to the heating element and/or to receive electrical signals from the first and second thermal sensors, and a support member adapted to hold the duct in the vent. The printed circuit boards structurally define the duct of the flowmeter, and at least one of the printed circuit boards comprises conductive traces operatively connected with the first and second thermal sensors and with the heating element. The electrical signals being transmitted via the conductive traces operatively connected with the thermal sensors allow to determine a temperature difference between the inlet temperature and the outlet temperature, the temperature difference being indicative of the air flow through the vent.

The electrical signals transmitted to the heating element via the at least one connector may be control signals to control heating element activation and deactivation, and wherein the electrical signals received from the thermal sensors are indicative of the inlet and outlet temperatures.

In an embodiment, the at least one connector is located on one of the printed circuit boards defining the duct and operatively connected with the heating element and with the thermal sensors, allowing for communicating with a control module integrated with or external to the flowmeter.

In an embodiment, the at least one connector comprises a first connector operatively connected with the heating element; and a second connector operatively connected with the thermal sensors.

In an embodiment, the first of the printed circuit boards is an upper printed circuit board, and the second of the printed circuit boards is a lower printed circuit board, and the printed circuit boards further comprise first and second lateral printed circuit boards which, together with the upper and lower printed circuit boards, structurally define the duct in a generally rectangular prism, the duct being sized to fit walls of the vent.

The heating element may include a plurality of wires of a conductive material, the wires being located across the duct and defining a matrix of wires adapted to generally uniformly heat the air.

In an embodiment, the flowmeter also includes conductive securing rings located on lateral sides of the printed circuit boards, the conductive securing rings of different printed circuit boards connected with together and adapted to electrically connect the printed circuit boards defining the duct.

In an embodiment, the first and second thermal sensors are advantageously chip printed circuit boards each comprising at least one temperature chip and conductive traces electrically connected with the temperature chip. The chip printed circuit boards extend across the duct between the lateral printed circuit boards, the temperature chips of the thermal sensors being electrically connected with the at least one connector via the conductive traces of the thermal sensors, via the conductive securing rings, and via the conductive traces of one of the printed circuit boards.

The chip printed circuit boards may include a plurality of temperature chips located on at least one of first and second areas of the thermal sensors, in which case a temperature measured by each of the chip printed circuit boards is based on an average temperature measured by the temperature chips.

In an embodiment, the first and second thermal sensors are resistance temperature detectors (RTD) each comprising a resistive printed circuit board, or RTD board. The RTD boards extend across the duct between the lateral printed circuit boards, the resistive printed circuit board being electrically connected with the at least one connector via the conductive securing rings and via the conductive traces of one of the printed circuit boards.

The resistive circuits of the RTD boards may be located on at least part of first and second surfaces of the RTD boards.

Advantageously, the flowmeter may further include at least an additional thermal sensor located downstream from the heating element, the outlet temperature being determined based on the thermal sensors located downstream from the heating element.

In an embodiment, the flowmeter further includes main electronic components configured for at least one of: conditioning of electrical signals propagated on the printed circuit boards; acquiring and digitizing output signals from the thermal sensors; and data processing of the output signals acquired from the thermal sensors. The main electronic components include parts, chips or electronic circuits operatively connected with the at least one connector, the thermal sensors and the heating element.

The at least one connector may be adapted to power the main electronic components.

In an embodiment, the wires comprise first and second ends respectively welded to the first and second of the printed circuit boards defining the duct, the wires being electrically connected in series via connection pads integrated to the first and second of the printed circuit boards.

The flowmeter may further include diagnostic means adapted to diagnose the heating element, the diagnostic means comprising: diagnostic electronic components; and a connection interface adapted to diagnose the heating element. The diagnostic means are located on at least one of the printed circuit boards defining the duct and adapted to allow evaluating proper operation of the heating element.

In an embodiment, the connection pads comprise a copper thickness adapted for a laser-welding of the wires of the heating element and the wires are laser-welded to the first and second of the printed circuit boards.

The flowmeter may advantageously include dissipation traces thermally connected to the connection pads and adapted to dissipate heat generated from the laser-welding of the heating element.

Further, the wires of the heating elements may be made of nichrome.

In an embodiment, each of the upper and lower printed circuit boards comprises a substantially rectangular section and two side fins located toward a front of the upper and lower printed circuit boards relative to the duct, the support member comprises a frame with a main opening corresponding to an opening of the duct, and the support member comprises slots adapted to receive the fins of the upper and lower printed circuit boards and a fastening mechanism adapted to secure the fins with the slots.

In an embodiment, the support member includes recesses to receive and protect the at least one connector located on a fin of at least one of the upper and lower printed circuit boards.

In an embodiment, the fastening mechanism comprising two bolts, a first bolt vertically traversing through the frame and a first pair of upper and lower side fins, and a second bolt vertically traversing through the frame and a second pair of upper and lower side fins, the bolts being located on each side of the duct.

Advantageously, the upper and lower printed circuit boards may be symmetrical and the first and second lateral printed circuit boards may also be symmetrical.

In an embodiment, one or more of the printed circuit boards comprises guiding projections and one or more other of the printed circuit boards comprises guiding notches, the projections and the notches fitting together to mechanically connect the printed circuit boards together.

In an embodiment, the printed circuit boards have a maximal length of 50 cm.

The flowmeter may advantageously be adapted to endure centrifugal forces from 0 to 300 g and temperatures reaching 70° C.

The flowmeter may advantageously be adapted to be inserted in a rotor rim vent of a hydroelectric generator, for measuring the air flow through the vent.

According to a second aspect, a system of ventilation analysis is included, the system comprising: at least one electronic thermal mass flowmeter of one of the embodiments described herein, a power source for powering the heating element of the at least one flowmeter, and a control module operatively connected with the at least one connector of the at least one flowmeter, the control module being configured to control power sent to the heating element.

In an embodiment, the system further includes a data acquisition module operatively connected with the at least one connector of the at least one flowmeter and adapted to receive data indicative of inlet and outlet temperatures measured by the thermal sensors.

The data acquisition module may advantageously be integrated to the flowmeter, the control module being further configured for receiving the data indicative of the inlet and the outlet temperatures from the data acquisition module.

The system may further include a user interface configured for controlling the flowmeter via the control module and for data analysis of the data indicative of the inlet and outlet temperatures, the data analysis including a determination of air flow through the flowmeter duct.

According to another aspect, a method for determining an air flow through a vent is included. The method includes at step of heating the air in the vent in a generally median section of the vent relative to an inlet and an outlet of the vent, a step of measuring, toward the inlet of the vent, an inlet temperature of the air circulating in the vent, a step of measuring, toward an outlet of the vent, an outlet temperature of the air circulating in the vent, the outlet temperature being modified by the heating of the air in the vent, and a step of calculating the air flow through the vent based on a difference being the outlet temperature and the inlet temperature in the vent.

DETAILED DESCRIPTION

Figure 1:
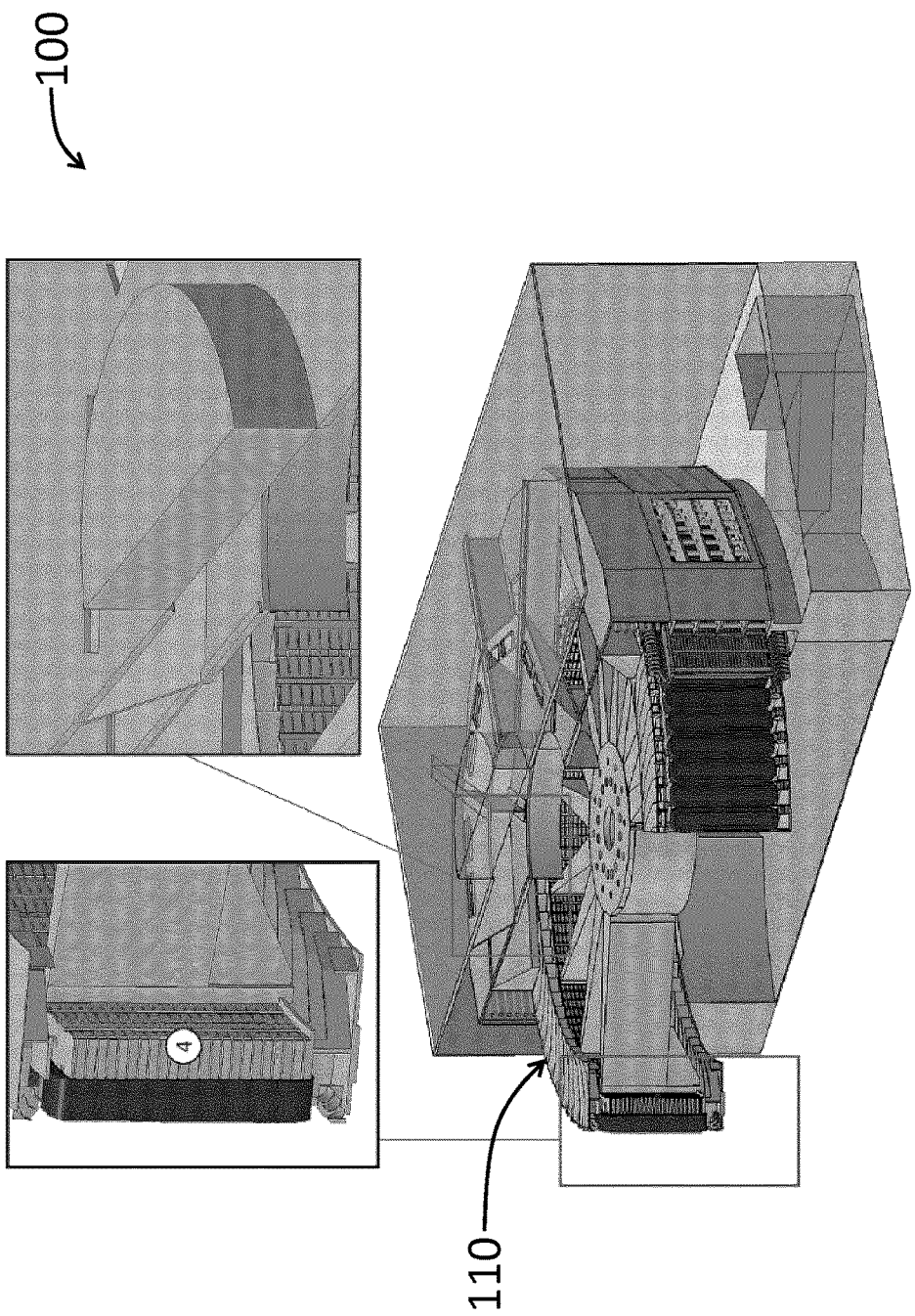
FIG. 1 is representation of a hydroelectric generator known in the art.

In the following description and figures, same reference numbers refer to similar elements of the invention. Furthermore, to not unduly clutter the figures, it is possible that a figure may not contain all the reference numbers of the elements found in the figure. It is also possible that some elements or components may be referenced in only one figure. The element thereby referenced can easily be inferred in the other figures shown. The embodiments, geometrical configurations, materials and/or dimensions shown in the figures or described in the present disclosure are indicative only, and show possible embodiments, presented as examples, and should not be interpreted as limitative of the invention.

In the present description, the term "vent" is used to describe a ventilation conduit in which the flowmeter can be installed. For example, the rotor rim of an hydroelectric generator rotor has vents allowing air to flow through for cooling the system. A vent can also refer to a ventilation conduit or duct used in the automotive field or in the heating, ventilation and air-conditioning (HVAC) field. In the exemplary embodiment described below, the term "rotor rim vent", or simply "vent", is used to describe the conduit or opening traversing the rotor rim and allowing air circulation through the rim, for ventilating the rotor poles and cooling the system.

The term "temperature chip" is used to refer to a device that reacts to temperature changes in the environment surrounding it and is used to measure a temperature, such as a thermistor. A temperature chip offers consistent linearity and sensitivity within a given temperature range. A variety of materials may be used in the manufacturing of the temperature chip, such as silicon or nickel, for example. The term "temperature chip" also refers to any sensor or micro-sensor capable of measuring a temperature, such as in a conduit or duct.

Additionally, the term "resistance temperature detector", or "RTD", is used to describe a device capable of measuring the temperature of the environment surrounding the RTD. An RTD includes a material having an electrical resistance that varies in a predictable and known manner based on the temperature. The temperature is then calculated based on the resistance of the RTD. A number of materials can be used in manufacturing the RTD, such as platinum and copper, as examples only.

Also, the term "pad" is used to describe a small-footprint area of a printed circuit board on which copper is deposited in order to enable soldering of a component onto the printed circuit board.

The term "heating element" is used to describe a component capable of releasing or generating energy as heat in a predictable and controllable manner. For example, a heating element can be an electrical component, such as one or more wires that generate heat when a current flows through it. A number of materials can be used as heating elements, such as nichrome or tungsten, as examples only.

Generally speaking, the present disclosure describes an electronic thermal mass flowmeter, or electronic heat balance flowmeter, and a system for measuring and analyzing air flow through a vent, allowing for determining ventilation through the vent. In the embodiment shown in FIGS. 1-13, the flowmeter is adapted and sized for installation in a vent of a hydroelectric generator rotor rim. However, the flowmeter can be used in other fields and with alternative applications, for example in the automotive or the HVAC industry, or any other field that may require analysis of fluid flow through a vent. Further, in the present disclosure, a hydroelectric generator could also refer to an alternator.

The flowmeter described herein operates according to a heat balance principle, determined by injecting a known amount of energy into a system, for example as heat, and by calculating an energy difference in the system, for example by measuring a temperature difference between a downstream point and an upstream point relative to the energy injection point. By measuring a difference between the downstream air temperature and the upstream air temperature, it is possible to determine air flow through the flowmeter and calculate the heat transfer from the rotor poles. The flowmeter includes an air flow duct through which air flows and within which energy is injected as heat. The duct of the flowmeter is shaped as to match the shape of the vent in which it is installed, and the air flow determined corresponds to the air flowing through the vent. Performance of a ventilation system can thus be assessed, and premature degradation of the hydroelectric generator can be reduced by identifying faults in the ventilation system.

Figure 2:
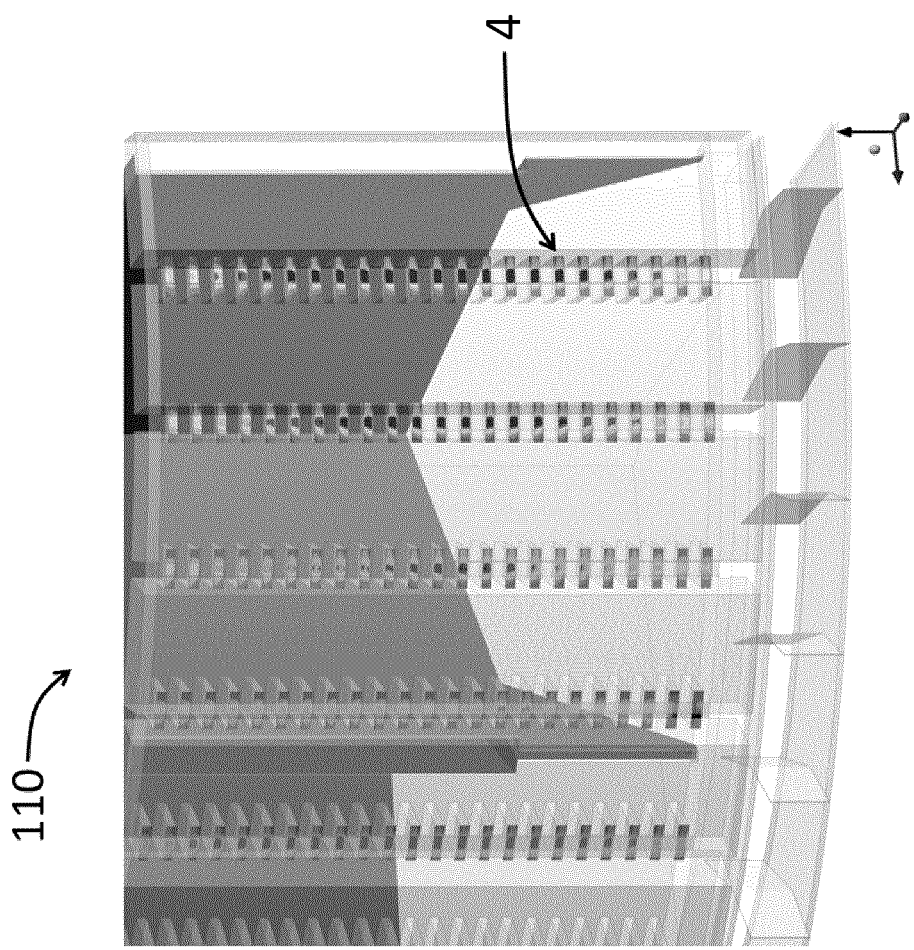
FIG. 2 is representation of a portion of a hydroelectric generator rotor with ventilation vents, known in the art.

FIGS. 1 and 2 show a hydroelectric generator known in the art related to the field. The hydroelectric generator 100 includes a rotor 110 rotating around a stator. The rotor 100 includes a number of vents 4 used for air circulation through the rotor rim toward the poles and for cooling the system.

Figure 3:
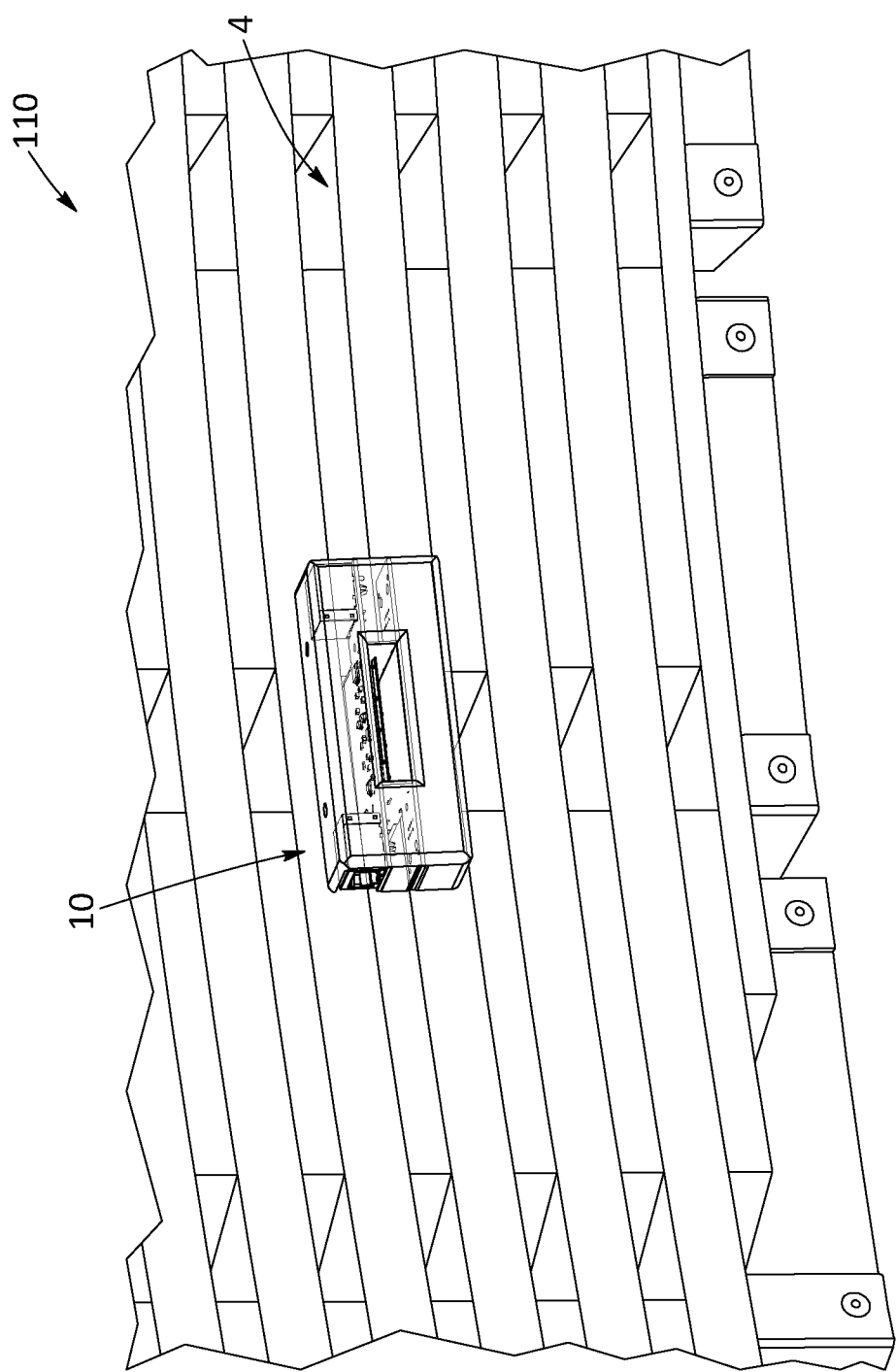
FIG. 3 shows an electronic thermal mass flowmeter installed in a rotor rim vent, according to a possible embodiment.

In FIG. 3, an electronic thermal mass flowmeter 10 (also known as an anemometer) according to the present disclosure is installed in one of rotor vents 4 to measure air flow through the vent 4. The flowmeter 10 includes an air flow duct (or structure) which preferably matches or conforms to the walls of the vent 4.

The flowmeter 10 operates on a heat-balance principle to measure the air flow through the vent in which it is installed, by measuring the air flow in the duct of the flowmeter 10. The flowmeter 10 shown in FIGS. 4 and 5 includes a heating element 20 that injects a given amount of energy as heat in the duct 12, and thermal sensors 22a, 22b, 22c located upstream and downstream from the heating element 20 and configured for measuring an inlet temperature and an outlet temperature, respectively, through the duct, in order to determine the temperature difference between the inlet temperature and the outlet temperature. The air flow is thereafter determined, or calculated, from the temperature difference and the amount of energy injected, the relation between the flow and temperature difference being well known in the art.

Figure 4:
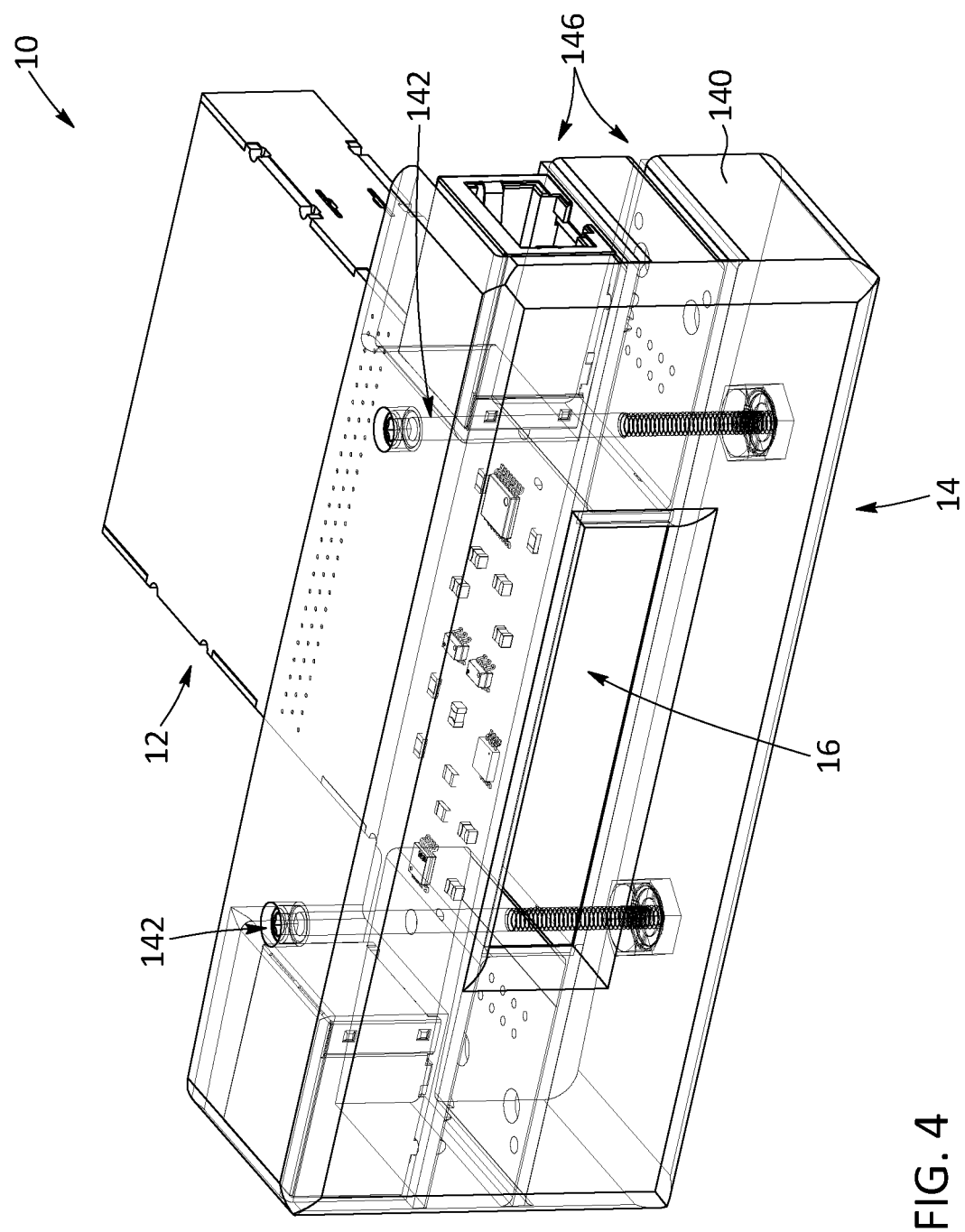
FIG. 4 is a front perspective view of the flowmeter shown in FIG. 3.
Figure 5:
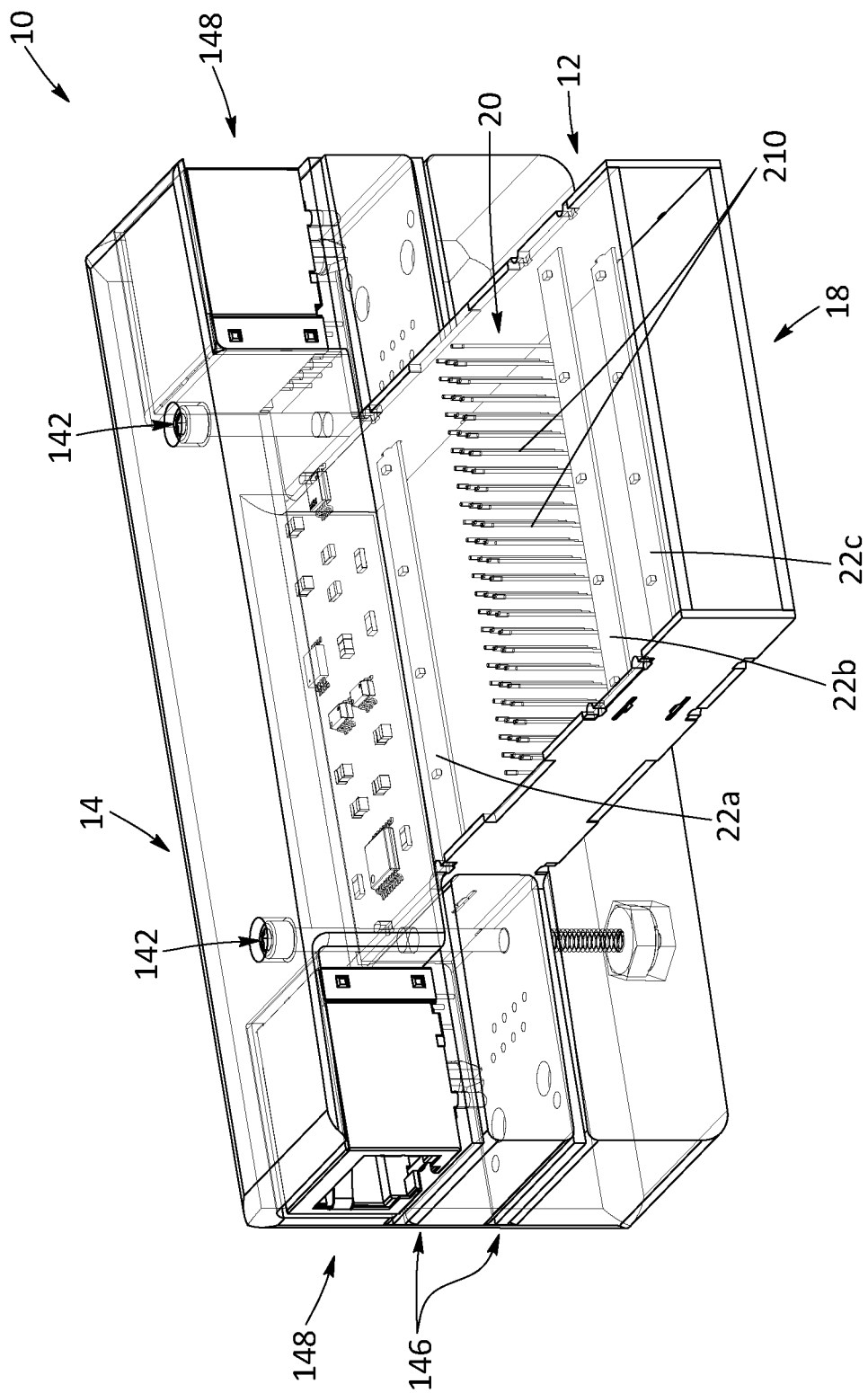
FIG. 5 is a rear perspective view of the flowmeter shown in FIGS. 3 and 4.
Figure 6:
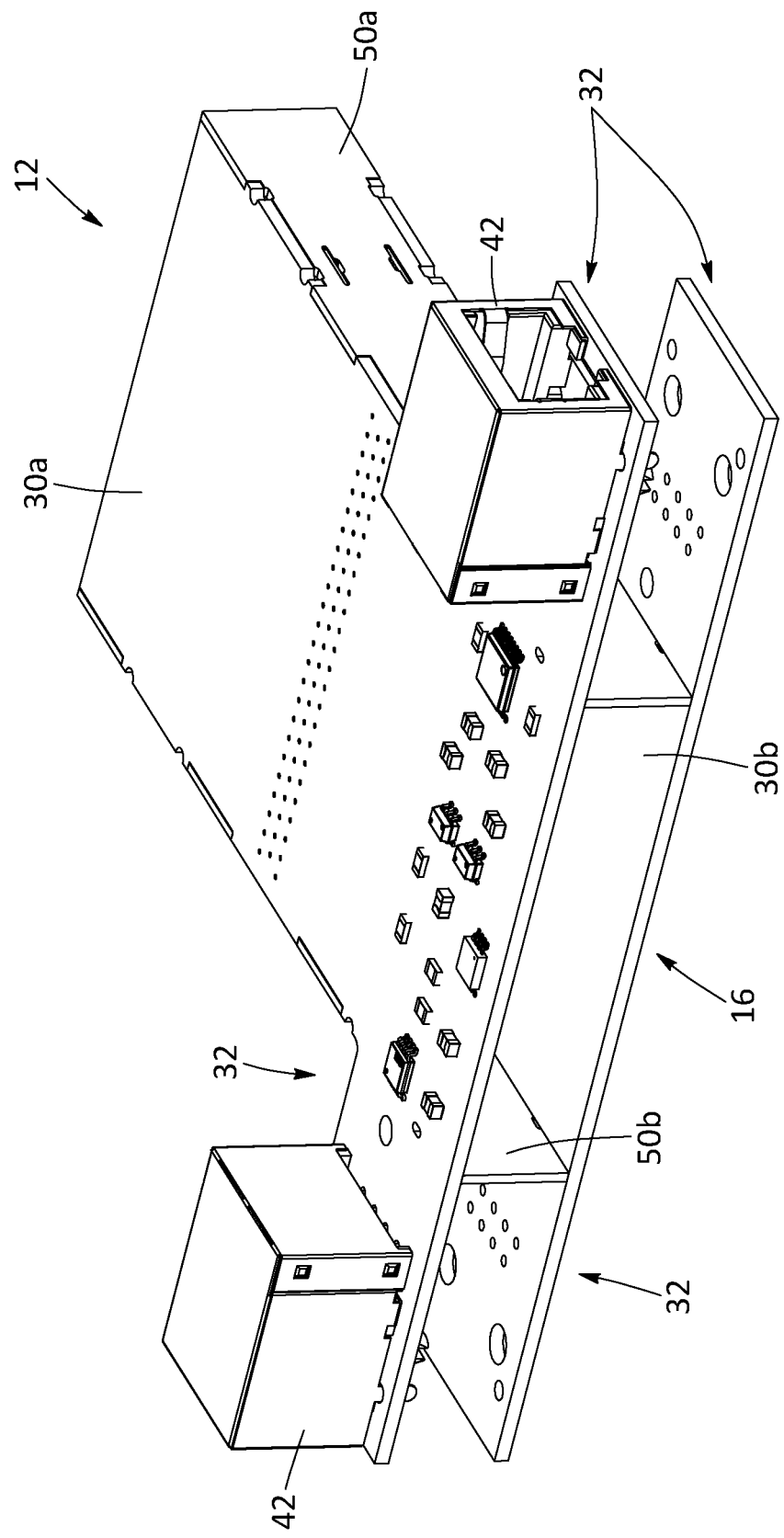
FIG. 6 is a front perspective view of the duct of the flowmeter show in FIGS. 3 to 5.

In the embodiment of FIGS. 4-6, the flowmeter 10 comprises duct 12 and support member 14. Air flows through the duct 12, entering via air inlet 16 and exiting via air outlet 18. The duct 12 is formed with printed circuit boards 30a, 30b and 50a, 50b. The air that would normally flow through the vent of the rotor rim therefore flows through the duct 12 when the flowmeter 10 is installed in the vent. Using the printed circuit boards as walls of the duct 12 advantageously allows for defining a duct 12 with thin walls, thereby limiting air flow obstruction caused by the flowmeter. Another advantage of using printed circuit boards is the low cost associated with manufacturing the flowmeter 10. Yet another advantage of using printed circuit boards as the structure of the duct 12 is that the rigidity and mechanical strength of the flowmeter conferred by the circuit boards allow for low physical deformation of the flowmeter, resulting in a lower measurement errors or inaccuracies when measuring the air flow in the flowmeter 10. Indeed, as the flowmeter is submitted to particular physical conditions that exist in hydroelectric generator rotors, such as centrifugal forces that can reach 300 g in some operating conditions and considerable temperature variations that arise from the temperature of the hydroelectric generator and the temperature of the heating elements that can reach up to 150° C., using printed circuit boards limits mechanical dilation of the circuits which can cause measurement inaccuracies from the thermal sensors. Resistance thermometer detector (RTD)-type thermal sensors are particularly sensitive to mechanical stress, and mechanical dilation or deformation can have a noticeable effect on the accuracy of RTD resistance measurements. The use of printed circuit board for both the structure of the duct and for integrating conductive traces of the circuits of the flowmeter therefore allows not only to reduce obstruction of air flow through the flowmeter, but also ensures better accuracy and stability of temperature measurements when the flowmeter is subjected to a number of operating conditions, thanks to the stability and uniformity of the material used to manufacture the duct.

The printed circuit boards (PCBs) forming or defining the flowmeter duct are made or manufactured from insulating layers of fiberglass-reinforced epoxy resin together with copper layers or traces to create the electrical traces. In the embodiments shown in FIGS. 3-13, the printed circuit boards are made from PCB-FR4 (Flame Resistant 4—according to the standard defined by the National Electrical Manufacturers Association (NEMA)). Obviously, other types of printed circuit boards and other materials may be used as a structure for the duct 12. The size of the electrical traces on the circuit boards and the amount of copper used to create the traces may vary to lower potential influence of thermal conduction of the traces on the measurements and accuracy of the system. For example, narrower electrical traces reduce the impact of thermal conduction from these traces.

The duct 12 is partially inserted into a frame 140 defining the support member 14 to secure the duct 12 in place.

The upper main printed circuit board 30a and lower main printed circuit board 30b comprise a generally rectangular section with side fins 32 fitting into slots 146 (FIG. 5) of the support member 14, the slots 146 designed to receive the side fins 32. The fins 32 include conductive traces where at least one connector 42, or connection means, such as a RJ-45 or a Molex® connector for example, is connected. It should be understood that other connectors allowing for signal transmission with the flowmeter may be used. For example, in the embodiments of FIGS. 4-8, two connectors are connected with the upper main board 30a. In other embodiments, a connector may be connected with each of upper and lower circuit boards, for example.

It should also be understood that the shape of each of the main boards 30a, 30b and of the lateral boards 50a, 50b may be modified without departing from the present application. For example, the printed circuit boards defining the duct 12 may have other sizes to accommodate different vent sizes. Each side of the printed circuit boards may further comprise a maximum size of 50 cm, which typically corresponds to the maximum possible size of manufactured printed circuit boards. Further, the main printed circuit boards 30a, 30b are preferably symmetrical, and the lateral printed circuit boards 50a, 50b are also preferably symmetrical. This symmetry allows for using a similar board design for each pair of circuit boards, thereby reducing resources needed to design and manufacture the different printed circuit boards. However, it is possible to use four different printed circuit boards without departing from the present disclosure.

Figure 9:
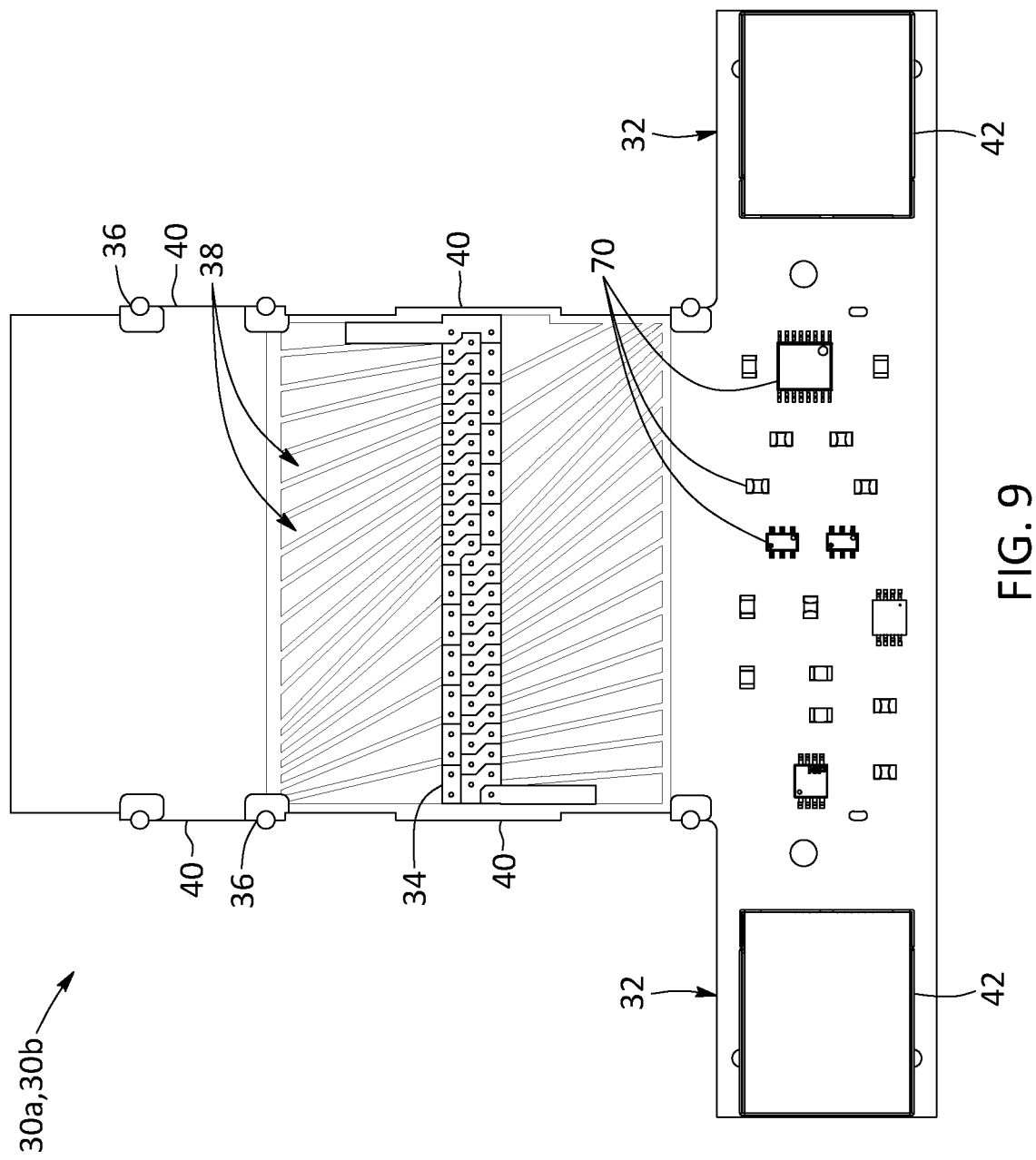
FIG. 9 shows an upper or lower printed circuit board partially defining the duct of the flowmeter, according to a possible embodiment.
Figure 10:
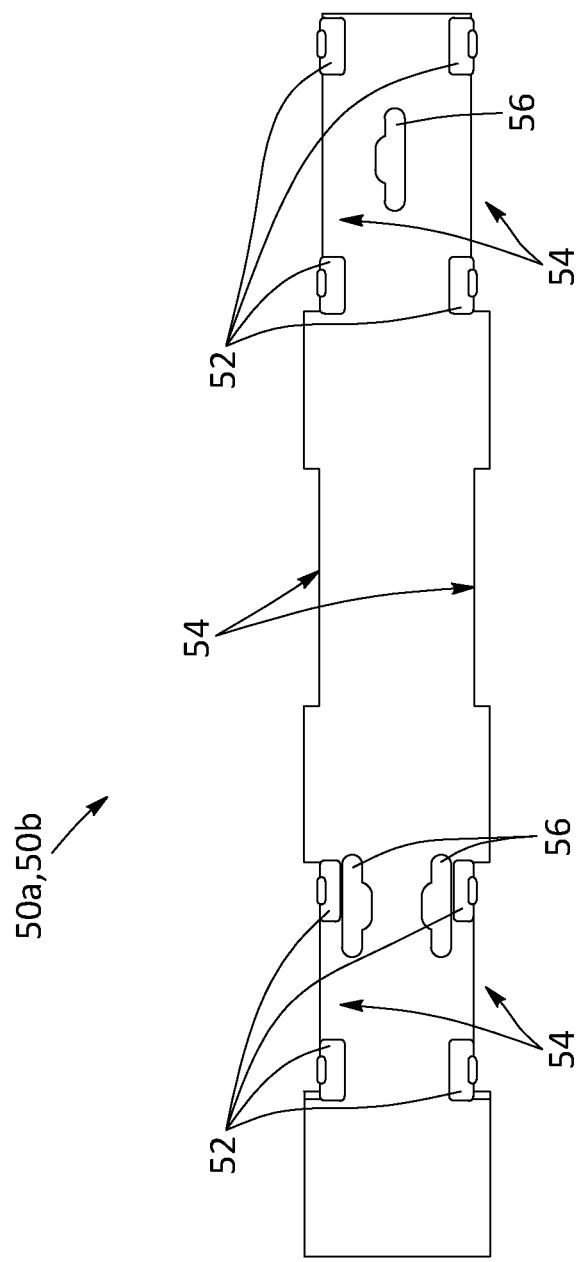
FIG. 10 shows a lateral printed circuit board partially defining the duct of the flowmeter, according to a possible embodiment.

Referring now to FIGS. 9 and 10, the printed circuit boards 30a, 30b and 50a, 50b preferably include guiding means for aligning the circuit boards with one another to define the structure of the duct 12. For example, the main boards 30a, 30b include guiding projections 40 extending laterally from the circuit boards. Corresponding guiding notches 54 are located laterally on the lateral boards 50a, 50b, allowing for fitting each circuit board forming the duct 12 with each other. Obviously, location of the guiding projections 40 and the guiding notches 54 may be reversed. Further, other guiding means may be used to facilitate aligning the circuit boards to form the flow duct 12.

Figure 8:
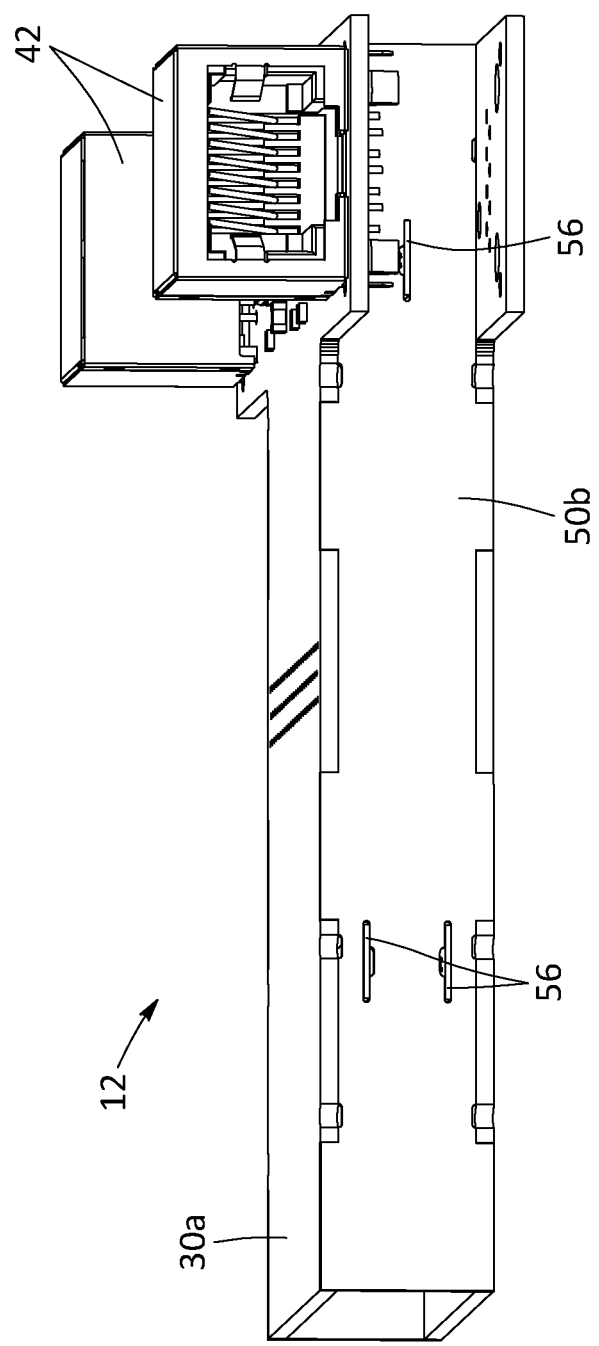
FIG. 8 is a side view of the duct of the flowmeter shown in FIG. 6.

The main circuit boards 30a, 30b and lateral circuit boards 50a, 50b also includes fastening means for securing together the circuit boards of the duct 12. In the embodiment of FIGS. 8-10, the main circuit boards 30a, 30b include primary securing rings 36 made of a conductive material and located laterally along the perimeter of the main circuit boards, in which secondary securing rings 52, also made of conductive material and located along the perimeter of the lateral circuit boards 50a, 50b, are inserted. The primary and secondary securing rings 36 and 52 are welded together to secure the circuit boards of the duct 12. For example, the primary securing rings 36 may be shaped as semi-circles projecting from the lateral sides of the main circuit boards 30a, 30b, into which the secondary securing rings 52, also shaped as semi-circles and projecting from the lateral sides of the lateral circuit boards 50a, 50b, are inserted, the primary and secondary securing rings crossing generally perpendicularly and creating a welding gap to weld the rings together. It should be understood that other fastening means may be contemplated by a person skilled in the art.

In a preferred embodiment, the primary and secondary securing rings 36 and 52 allow for operatively connecting the main circuit boards 30a, 30b with the lateral circuit boards 50a, 50b. For example, conductive traces located on a lateral circuit board can be electrically connected with conductive traces located on a main circuit board via the securing rings, allowing to transmit electrical signals between the printed circuit boards defining the duct 12.

Referring now to the embodiment of FIG. 10, the lateral circuit boards 50a, 50b include terminal connectors 56 adapted to receive and connect with the thermal sensors 22a, 22b, 22c. The terminal connectors 56 are operatively connected to the at least one connector 42 via the securing rings described hereinabove, the connector 42 allowing transmission of electrical signals indicative of the temperatures measured by the thermal sensors. For example, the terminal connectors 56 are operatively connected with the at least one connected 42 adapted to transmit temperature measurements from the thermal sensors. The terminal connectors 56 define cavities through the lateral circuit boards 50a, 50b in which are inserted terminals 224 (FIG. 11) of the thermal sensors, physically securing the thermal sensors in the duct 12 and allowing the transmission of electrical signals. In alternative embodiments, the terminal connectors 56 are connected with electronic chips and/or electronic components as described below, for example, instead of with the at least one connector 42, allowing for conditioning or processing the electrical signals from the thermal sensors. Furthermore, the terminal connectors 56 may be located on the main printed circuit boards 30a, 30b in embodiments where the thermal sensors are arranged vertically in the duct 12.

In the embodiment of FIG. 9, the main printed circuit board 30a, 30b includes main electronic components 70, such as electronic parts, chips or electronic circuits. The main electronic components 70 are configured for conditioning the electrical signals propagated on the printed circuit boards. The conditioning may include signal amplification of the signal outputs from the thermal sensors 22a, 22b, 22c or for exciting the heating element 20, for example. The electronic components are further configured for signal acquisition or digitalization of the electrical signals output from the thermal sensors 22a, 22b,22c and/or for data processing of the signals output from the thermal sensors and for control of the heating element 20. The main printed circuit boards 30a, 30b also include two connectors 42, located on each of the lateral fins 32, allowing for transmitting/exchanging electrical signals with the heating element and the thermal sensors. The connectors 42 are adapted to receive a power supply external to the flowmeter for powering the main electronic components 70, and to allow transmitting the electrical signals with the electronic components, such control signals or signals representative of the temperature measurements. The printed circuit boards 30a, 30b also include connection pads 34 to enable inserting and connecting the heating element 20 with the circuit boards, and further include dissipation traces 38 adapted to dissipate the heat generated from the welding of the heating element. The securing rings 36 are configured for connecting the main circuit boards 30a, 30b with the lateral circuit boards 50a, 50b as described hereinabove.

Figure 13:
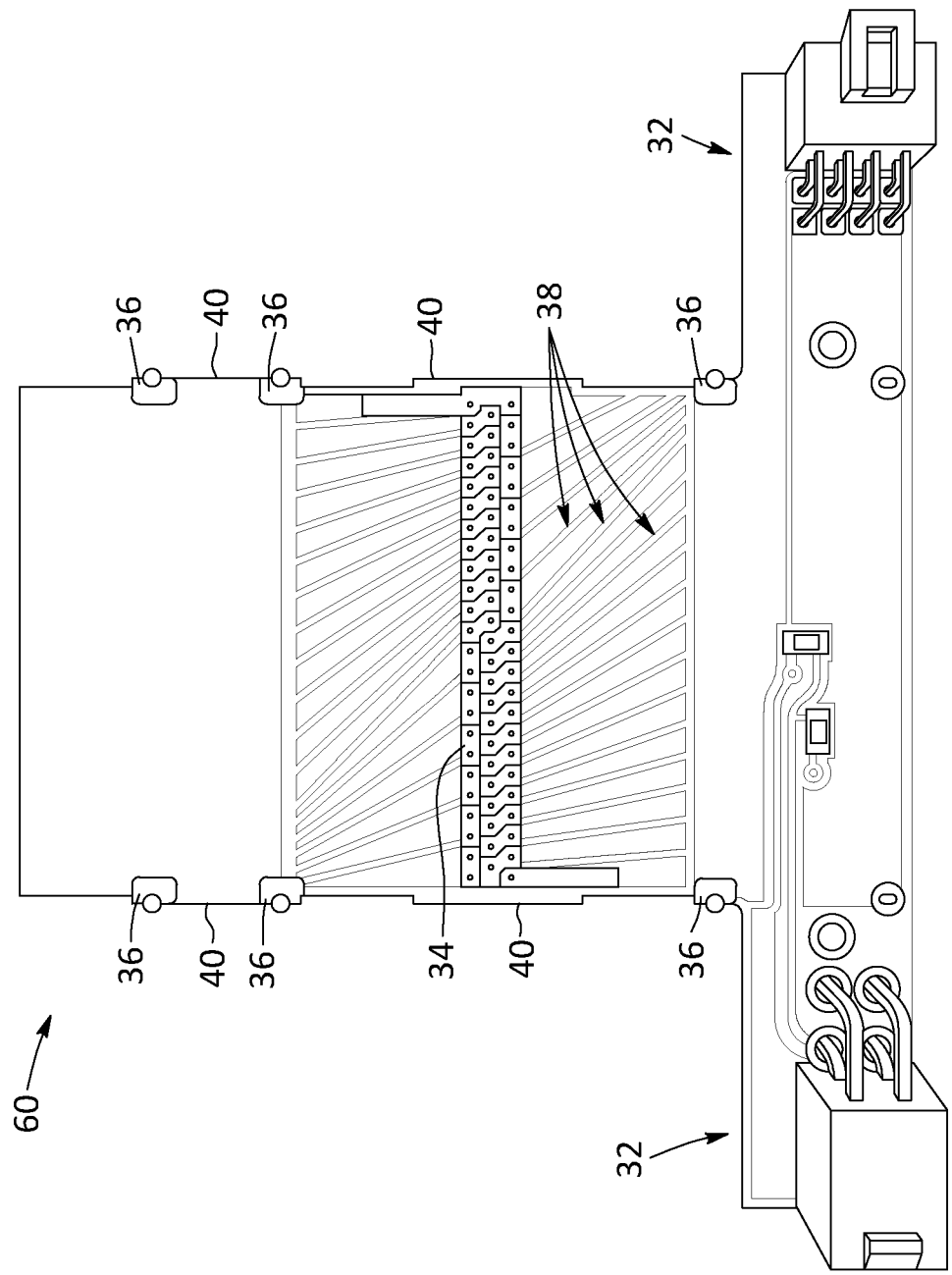
FIG. 13 shows an upper or lower printed circuit board partially defining the duct of the flowmeter, according to another possible embodiment.

An alternative main printed circuit board 60 is shown in FIG. 13. In this alternative embodiment, the circuit board 60 generally includes similar elements to the circuit board of FIG. 9. However, circuit board 60 does not include the main electronic components 70. Thus, in this embodiment, data processing, conditioning and acquisition is performed externally from the circuit board 60, and the connectors 42 are therefore configured for transmitting signals indicative of thermal sensor measurements as well as for receiving heating element control signals.

In a preferred embodiment, all the electronic components, the printed circuit boards 30a, 30b, 50a, 50b and the thermal sensors 22a, 22b, 22c described herein are capable of withstanding maximum temperatures of approximately 160° C. as the heating element may reach a temperature of around 150° C.

Referring again to FIGS. 4 and 5, the support member 14 allows for maintaining the flowmeter in the rim vent when the rotor is in operation. In a preferred embodiment, the frame 140 of support member 14 is manufactured via a 3D printing process. For example, the frame 140 is manufactured with a material such as Ultem 9085. One of the advantages of 3D manufacturing is that is reduces production costs and it makes it easy to alter the sizes of the support member and duct to suit a variety of rotor rim vents. Using Ultem 9085 further allows operating the flowmeter in an environment with maximum temperatures reaching 70° C. Other configurations and materials may be contemplated without departing from the present disclosure.

The support member 14 defines an opening generally corresponding with the duct 12. The frame 140 of the support member 14 further includes a fastening mechanism for securing at least one of the printed circuit boards forming the duct 12 with the support member 14. The fastening mechanism includes two pairs of bolts and nuts 142 vertically traversing the frame 140 and the upper and lower main printed circuit boards 30a, 30b of the duct 12. In alternative embodiments, the bolts traverse horizontally through the frame 140 and the lateral printed circuit boards 50a, 50b. It should be understood that other fastening mechanisms can be contemplated to secure the support member 14 with the duct 12.

The support member 14 includes slots 146 configured for receiving fins from one or more printed circuit boards. For example, slots 146 are configured for receiving the side fins 32 of the main printed circuit boards 30a, 30b. Further, the support member 14, in a preferred embodiment, includes recesses 148 for receiving the at least one connector 42 located on at least one of the upper and lower printed circuit boards 30a, 30b of the duct 12.

As previously mentioned, the flowmeter 10 includes a heating element 20 configured for injecting energy as heat in the air flowing through the duct 12. The heating element 20 is preferably located across the air flow in the duct and is operatively connected with connectors 42 for control purposes. The heating element 20 includes a plurality of wires 210, also referred to as filaments. Each of the wires 210 has a first end connected with the upper main circuit board 30a and a second end connected with the lower main circuit board 30b. In a preferred embodiment, the heating element 20 comprises a plurality of nichrome wires 210 connected in series via the connection pads 33 located on the main circuit boards 30a, 30b. For example, the heating element 20 includes a matrix of 50 to 100 wires each with a diameter of between 300 and 500 μm, arranged in a number of rows transverse to the air flow (the configuration comprises three rows in the shown embodiment). In the embodiment shown, 72 wires each having a diameter of 330 μm are used, but a different number of wires and/or wire diameters may be used depending on the field in which the flowmeter is used.

During experiments, it was observed that using a vertical arrangement or configuration of the wires in the duct 12, in which the wires are connected with the main circuit boards 30a, 30b, allows for a more uniform heating of the air flowing through the duct 12 of the flowmeter 10 compared with a horizontal arrangement of the wires, in which the wires are connected with the lateral circuit boards 50a, 50b. Indeed, the vertical arrangement of the wires allows for increasing, or maximizing, the total area covered by the wires 210 without contacting the circuit boards defining the duct 12, therefore allowing for a better uniformity of heat diffusion in the duct 12. However, it should be understood that the heating element 20 may be positioned or located differently relative to the duct 12 without departing from the present disclosure. For example, the wires may be arranged in a horizontal configuration. Furthermore, it should be understood that other types of heating devices or elements may be contemplated.

The wires 210 forming the heating element 20 are laser-welded to the main circuit boards 30a, 30b which include connection pads 34 for welding said wires 210. The connection pads contain a copper thickness of approximately 0.25 mm, or any suitable amount of copper that allows for laser-welding the wires 210 on the main circuit boards 30a, 30b without affecting the integrity of the circuit boards. Dissipation traces 38 are also printed on the main circuit boards 39a, 30b to help dissipating the heat generated by the laser-welding. The dissipation traces 38, in some embodiments, are conductive traces printed on the main boards 30a, 30b and are connected with the connection pads 34. It should be understood that other types of welding may be used, such as tin welding, for example, for securing/connecting the wires 210.

Figure 7A:
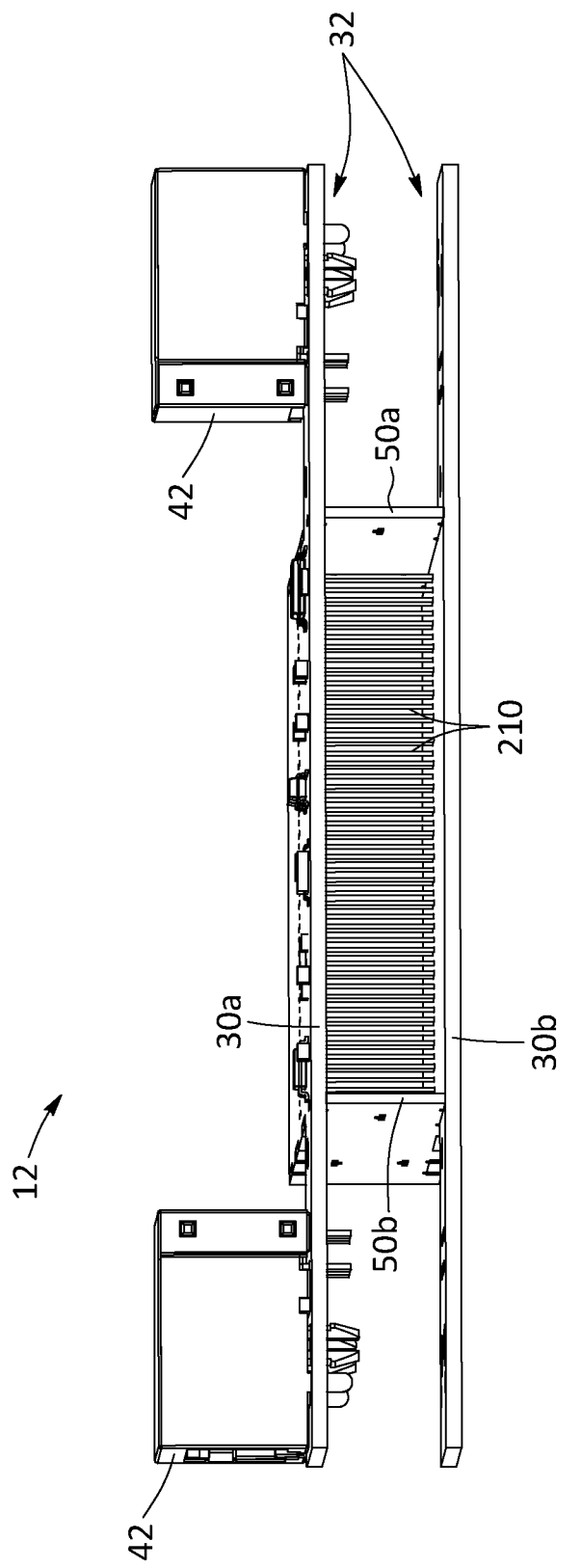
FIG. 7A is a front view of a duct of the flowmeter shown in FIG. 6, with the thermal sensors removed to better display the heating element.
Figure 7B:
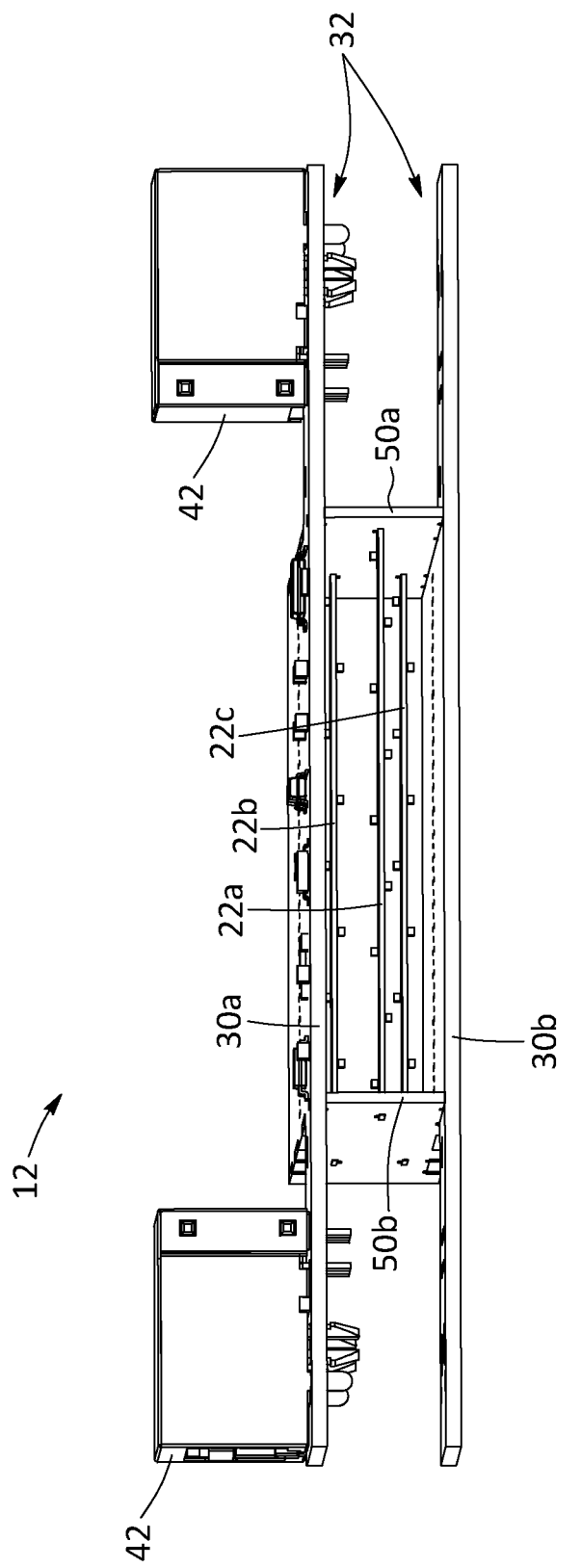
FIG. 7B is a front view of the duct of the flowmeter shown in FIG. 6, with the thermal sensor removed for clarity.

Still referring to FIGS. 4 and 5, as well as to FIG. 7B, the flowmeter 10 also includes the thermal sensors 22a, 22b, 22c adapted to measure the temperature of the air flowing through the flow duct 12. A first sensor 22a is located upstream from the heating element 20 relative to the air flowing into the duct 12, so as to measure the temperature of the air entering the flowmeter 10, or inlet temperature. A second thermal sensor 22b is located downstream from the heating element 20 relative to the air flowing into the duct 12, so as to measure the temperature of the air exiting the flowmeter 10, or outlet temperature. In a preferred embodiment, an additional thermal sensor 22c is located downstream from the heating element 20. The outlet temperature may therefore be determined using a combination of the temperatures measured by sensors 22b and 22c, for example by averaging the outlet temperature measurements of both sensors. The number and configuration of the thermal sensors located downstream and upstream from the heating element may vary based on the use of the flowmeter. For example, a flowmeter with different sizes may benefit from adding additional thermal sensors upstream and/or downstream from the heating element in order to better determine an average temperature in the duct 12. In the embodiment of FIGS. 5 and 7B, the thermal sensors 22b and 22c are symmetrically located opposite to each other relative to a horizontal median plane of the flowmeter 10. This configuration allows for determining an average temperature measurement of the air flowing in the duct 12, the temperature being representative of the temperature of all the air flowing through the flow duct 12. The thermal sensors 22a, 22b, 22c are connected with the terminal connectors 56 of the lateral circuit boards 50a, 50b, allowing for the temperature values measured by each thermal sensor to be transferred to the connectors 42.

Figure 12:
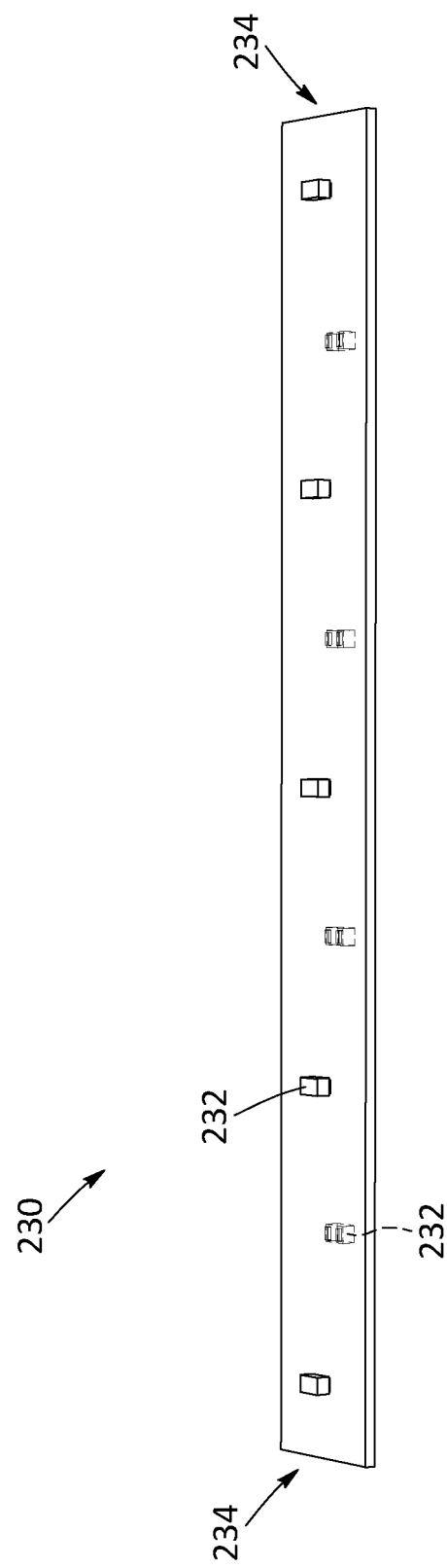
FIG. 12 shows a printed circuit board with a temperature chip, defining a thermal sensor, according to another possible embodiment.

In the embodiment of FIG. 12, each thermal sensor is a chip printed circuit board 230 including temperature chips 232. The chips 232 are welded to connection pads located on the chip printed circuit board 230. In this embodiment, nine (9) chips 232 are located on two opposite faces of the chip printed circuit board 230. In FIG. 12, the chips 232 in dotted lines indicate chips that are located on a lower face of the thermal sensor. The location of the chips, as alternating along each face of the thermal sensor, allows for limiting obstruction of the air flow that is created by the thermal sensor and to obtain a better spatial distribution of measure points. Thus, the temperature that is determined by the thermal sensor can be calculated using the average temperatures measured by each of the chips 232, allowing for better precision of the temperature values measured by the thermal sensor of the duct 12. It should be understood that a different number and/or location of the temperature chips 232 may be contemplated without departing from the present disclosure. For example, the chips 232 may be located only on one face of the chip printed circuit board 230.

The chip printed circuit board 230 of FIG. 12 comprises two terminals 234 for connecting the thermal sensor with the terminal connectors 56 of each lateral printed circuit board 50a, 50b. The terminals 234 therefore operatively connect with the connectors 42 of the flowmeter 10. As mentioned hereinabove, the lateral circuit boards 50a, 50b are connected with at least one of the upper and lower printed circuit boards via pairs of primary and secondary securing rings 36 and 52, thereby operatively connecting the terminals 234 with the connectors 42. Alternatively, the terminals may be operatively connected with parts, chips or electronic circuits of the main electronic components (ref. 70 in FIG. 9) located on at least one of the main and lateral printed circuit boards and configured for processing and/or conditioning the signals transmitted from the thermal sensors. The terminals 56 allow for transmitting the signals indicative of the measurements made by the thermal sensors. For example, these signals may be a voltage indicative of a temperature measured by each chip 232.

Figure 11:
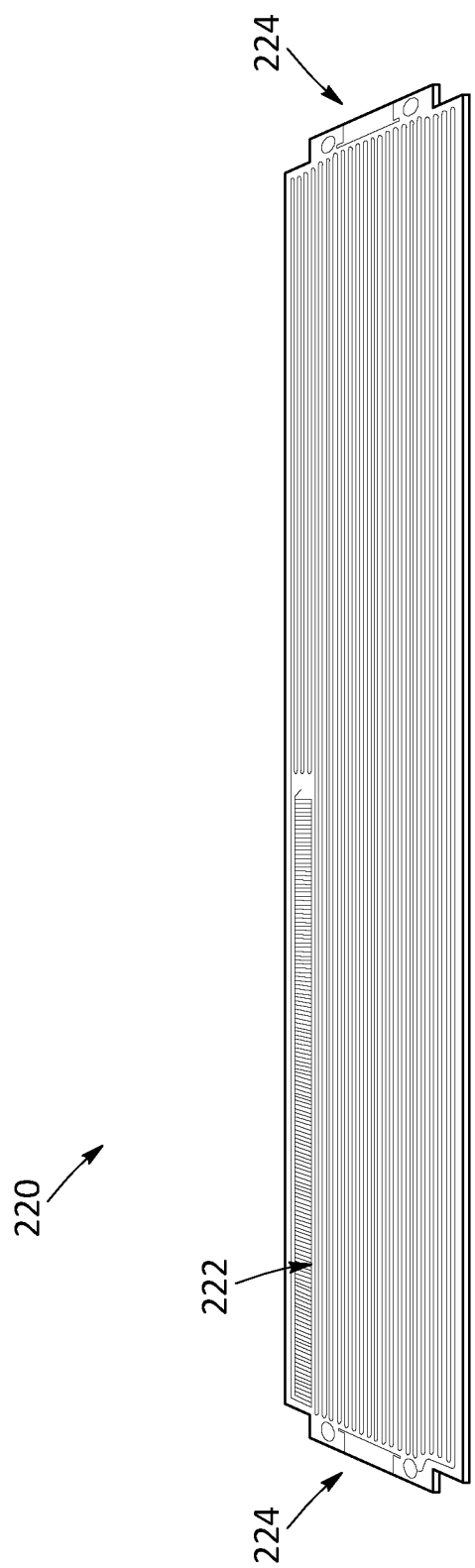
FIG. 11 shows a resistive printed circuit board of a resistance thermometer (RTD), defining a thermal sensor, according to a possible embodiment.

In an alternative embodiment shown in FIG. 11, each thermal sensor is a resistance thermometer (RTD) 220. The RTD 220 shown comprises a resistive printed circuit board 222 defining the resistive element of the RTD. In a preferred embodiment, the printed circuit or trace of the resistive printed circuit board 222 is a copper coil partially covering both faces (upper and lower) of the resistive printed circuit board 222. In some embodiments, the trace may only partially cover an area of both faces, or cover substantially one face, for example. In the embodiment shown, the resistive printed circuit board has a thickness of 0.4 mm and a wideness of 7 mm, but the size of the thermal sensor may vary depending on the size of the flowmeter, the vent size, the location or placement of the sensor in the duct 12 of the flowmeter 10, and the field of use of the flowmeter. One advantage of manufacturing the RTD with a printed circuit board is the mechanical strength provided by the circuit board, reducing potential mechanical dilation/deformation of the resistive circuit which may result in temperature measurement inaccuracies. In some embodiments, the copper coil may be replaced by copper wires, a resistive substrate, or a resistive electronic component, for example. The RTD 220 also includes terminals 224 adapted to connect the RTD with the terminal connectors 56 located on each of the two lateral printed circuit boards 50a, 50b. The terminals 224 are operatively connected with the connectors 42 and allow for transmitting signals indicative of temperature measurements from the RTD 220. For example, the signals may be voltages corresponding with a resistance value of the RTD and indicative of a temperature in the duct 12.

In alternative embodiments, the resistive printed circuit may be embedded or printed directly on one of the printed circuit boards defining the duct 12. For example, the thermal sensors 22a, 22b may be located or printed onto the upper main printed circuit board 30a, and the thermal sensor 22c, onto the lower main printed circuit board 30b.

The thermal sensors 22a, 22b, 22c may, alternatively, be manufactured using electronic circuits, such as thermocouples or thermistors, for example. Further, while in the embodiments shown, the thermal sensors 22a, 22b, 22c are arranged horizontally in the conduit 12, they may be arranged differently, such as vertically in the conduit 12, without departing from the present disclosure.

The thermal sensors 22a, 22b, 22c and the heating element 20 are all operatively connected with the at least one connector 42, or connectors 42, which comprise two RJ-45-type connectors located on the upper and lower main printed circuit boards 30a, 30b. The connectors 42 are adapted to transmit signals indicative of the inlet and outlet temperatures measured by the thermal sensors 22a, 22b, 22c. Additionally, or alternatively, the connectors 42 are also adapted to allow controlling the flowmeter, for example by transmitting control signals for controlling the intensity or frequency of operation of the heating element 20, and exchanging data from the flowmeter. In alternative embodiments where the flowmeter includes electronic components for processing or conditioning signals from the thermal sensors or for the heating element, the connectors 42 are operatively connected with said electronic components.

In a preferred embodiment, a system for ventilation analysis in a hydroelectric generator, including at least one flowmeter 10, is provided. The system includes a current/power source, operatively connected with the connectors 42 of the flowmeter 10 for powering the flowmeter. The power source, via the connectors 42, is therefore operatively connected with the heating element 20. For example, power may be provided to the heating element 20, to the main electronic components 70, to the chips of the thermal sensors, and to diagnostic means as described below.

The system for ventilation analysis also includes a data acquisition module adapted to capture temperature measurements generated by the thermal sensors 22a, 22b, 22c. For example, the resistance values of each thermal sensors are transmitted to and acquired by the data acquisition module. The data acquisition module may be external to the flowmeter and operatively connected with the connectors 42, or alternatively integrated to the flowmeter 12 via electronic components located on one of the printed circuit boards.

The system for ventilation analysis also includes a control module adapted to control power provided to the flowmeter 10 and to manage operation of the flowmeter 10. The control module includes communication means with the flowmeter 10, for example via the connectors 42. The control module allows for controlling the frequency and/or operating period of the flowmeter, the amount of power sent to the heating element, and the frequency of data acquisition or temperature measurements made by the thermal sensors, for example. The system for ventilation analysis may include a plurality of flowmeters installed or located in a number of rotor rim vents, allowing for more accurately determining the airflow through the rotor. In this embodiment, the plurality of flowmeters may be operatively connected in series with each other and with the control module or connected in parallel with the control module. The control module, in this embodiment, is adapted to control and acquire data from each of the flowmeters. In a preferred embodiment, the control module is a separate device, or circuit board, located in the hydroelectric generator and operatively connected with the flowmeters.

The system for ventilation analysis also includes a computing device operatively connected with the data acquisition module and the control module using a power line carrier (PLC) connection, a wired connection, or a wireless connection, for example, and including a graphical interface allowing for viewing data acquired and controlling the control module. The computing device includes a processor and a physical non-volatile memory including processor-readable instructions and is adapted to calculate, in real-time for example, the airflow through a vent of the rotor based on temperatures measured upstream and downstream from the heating element in the duct 12. For example, the graphical interface allows for displaying results and/or data from the thermal sensors and results from the calculated airflow in the duct 12. In some embodiments, the system for ventilation analysis may be adapted to automatically send alert signals, for example via the graphical interface, when the calculated airflow in the flowmeter 10 reaches a predetermined upper or lower limit. The alert signals may also be sent as messages to a phone, for example.

In some embodiments, the flowmeter 10 also includes diagnostic means adapted for validating the integrity of the wires 210 and of the wire solders on the connection pads 34. For example, the diagnostic means may include a set of electronic components adapted for diagnostic, or one or more sensors having a connection interface allowing for connecting a diagnostic cable and performing a diagnostic of the heating element 20 and acquiring diagnostic data. Alternatively, the diagnostic means may be integrated to the flowmeter. In some embodiment, diagnostics may be automatically performed by the flowmeter. The diagnostic means may also, in some embodiments, generate alert signals when a malfunction is detected during diagnostic. In embodiments where a plurality of flowmeters 10 are installed in the rim of a hydroelectric generator rotor, the system may be configured, using the graphical interface, to control each of the sensors in deactivated and/or activated states, for example based on the diagnostic of the flowmeters.

The electronic thermal mass flowmeter described hereinabove is stable, compact, relatively lightweight, and can be manufactured at a reasonable cost. Indeed, the proposed flowmeter is sufficiently robust to sustain the physical conditions that are present in the moving rotors, and its manufacturing cost should be low enough to allow simultaneously installing a plurality of flowmeters in a rotor. The use of printed circuit boards to form, or define, the duct of the flowmeter and for the thermal sensors results in a flowmeter assembly having a mechanical and material consistency allowing for generating a "uniform" physical behavior when the flowmeter is submitted to varying physical operating conditions (e.g., temperature and forces present in the rotor). The proposed flowmeter can also be adapted to a number of vent types and sizes used in various fields.

Several embodiments and examples have been described hereinabove. These embodiments and examples are described as examples only. A person skilled in the art will be able to recognize that any combination of the embodiments described could be provided. Further, it will be understood that the embodiments described herein are not limitative and that other particular embodiments may be provided without departing from the main features and scope of the present disclosure. The invention shall not be considered limited to the details described herein.

What is claimed is:

1. An electronic thermal mass flowmeter to determine an air flow through a vent, the flowmeter comprising:
   printed circuit boards defining a duct adapted to be inserted into the vent;
   a heating element located across the duct, adapted to heat air passing through the duct, the heating element extending from a first to a second of the printed circuit boards opposite the first of the printed circuit boards;
   a first thermal sensor located upstream from the heating element relative to the air flow and adapted to measure an inlet temperature of the air;
   a second thermal sensor located downstream from the heating element relative to the air flow and adapted to measure an outlet temperature of the air;
   at least one connector adapted to transmit electrical signals to the heating element and/or to receive electrical signals from the first and second thermal sensors; and
   a support member adapted to hold the duct in the vent;
   the printed circuit boards structurally defining the duct of the flowmeter;
   at least one of the printed circuit boards comprising conductive traces operatively connected with the first and second thermal sensors and with the heating element; and
   the electrical signals being transmitted via the conductive traces operatively connected with the thermal sensors allowing to determine a temperature difference between the inlet temperature and the outlet temperature, the temperature difference being indicative of the air flow through the vent.

2. The flowmeter of claim 1, wherein the electrical signals transmitted to the heating element via the at least one connector are control signals allowing to control heating element activation and deactivation, and wherein the electrical signals received from the thermal sensors are indicative of the inlet and outlet temperatures.

3. The flowmeter of claim 1, wherein the at least one connector is adapted to exchange the electrical signals with a control module operatively connected with the flowmeter, and wherein the at least one connector comprises:
- a first connector operatively connected with the heating element; and
- a second connector operatively connected with the thermal sensors.

4. The flowmeter of claim 1, wherein:
the first of the printed circuit boards is an upper printed circuit board, and the second of the printed circuit boards is a lower printed circuit board; and
the printed circuit boards further comprise first and second lateral printed circuit boards which, together with the upper and lower printed circuit boards, structurally define the duct in a generally rectangular prism, the duct being sized to fit walls of the vent.

5. The flowmeter of claim 1, wherein the heating element includes a plurality of wires of a conductive material, the wires being located across the duct and defining a matrix of wires adapted to generally uniformly heat the air.

6. The flowmeter of claim 1, further comprising conductive securing rings located on lateral sides of the printed circuit boards, the conductive securing rings of different printed circuit boards connected with together and adapted to electrically connect the printed circuit boards defining the duct.

7. The flowmeter of claim 6, wherein:
the first and second thermal sensors are chip printed circuit boards each comprising at least one temperature chip and conductive traces electrically connected with the temperature chip; and
the chip printed circuit boards extend across the duct between the lateral printed circuit boards, the temperature chips of the thermal sensors being electrically connected with the at least one connector via the conductive traces of the thermal sensors, via the conductive securing rings, and via the conductive traces of one of the printed circuit boards.

8. The flowmeter of claim 7, wherein:
the chip printed circuit boards comprise a plurality of temperature chips located on at least one of first and second areas of the thermal sensors; and
a temperature measured by each of the chip printed circuit boards is based on an average temperature measured by the temperature chips.

9. The flowmeter of claim 6, wherein:
the first and second thermal sensors are resistance temperature detectors (RTD) each comprising a resistive printed circuit board, thereafter RTD board; and
the RTD boards extend across the duct between the lateral printed circuit boards, resistive circuits of the RTD boards being electrically connected with the at least one connector via the conductive securing rings and via the conductive traces of one of the printed circuit boards.

10. The flowmeter of claim 1, further comprising at least an additional thermal sensor located downstream from the heating element, the outlet temperature being determined based on the thermal sensors located downstream from the heating element.

11. The flowmeter of claim 5, wherein the wires comprise first and second ends respectively welded to the first and second of the printed circuit boards defining the duct, the wires being electrically connected in series via connection pads integrated to the first and second of the printed circuit boards.

12. The flowmeter of claim 1, further comprising diagnostic means adapted to diagnose the heating element, the diagnostic means comprising:
diagnostic electronic components; and
a connection interface adapted to diagnose the heating element;
the diagnostic means located on at least one of the printed circuit boards defining the duct and adapted to allow evaluating proper operation of the heating element.

13. The flowmeter of claim 5, wherein:
the connection pads comprise a copper thickness adapted for a laser-welding of the wires of the heating element;
the wires are laser-welded to the first and second of the printed circuit boards; and
dissipation traces are thermally connected to the connection pads and adapted to dissipate heat generated from the laser-welding of the heating element.

14. The flowmeter of claim 4, wherein:
each of the upper and lower printed circuit boards comprises a substantially rectangular section and two side fins located toward a front of the upper and lower printed circuit boards relative to the duct;
the support member comprises a frame with a main opening corresponding to an opening of the duct; and
the support member comprises slots adapted to receive the fins of the upper and lower printed circuit boards and a fastening mechanism adapted to secure the fins with the slots.

15. The flowmeter of claim 1, wherein one or more of the printed circuit boards comprises guiding projections and one or more other of the printed circuit boards comprise guiding notches, the projections and the notches fitting together to mechanically connect the printed circuit boards together.

16. The flowmeter of claim 1, further adapted to endure centrifugal forces reaching 300 g and temperatures reaching 70° C.

17. The flowmeter of claim 1, wherein the flowmeter is adapted to be inserted in a rotor rim vent of a hydroelectric generator, for measuring the air flow in the vent.

18. A system of ventilation analysis comprising:
at least one electronic thermal mass flowmeter as defined in claim 1;
a power source for powering the heating element of the at least one flowmeter; and
a control module operatively connected with the at least one connector of the at least one flowmeter, the control module being configured to control power sent to the heating element.

19. The system of claim 18, further comprising:
a data acquisition module operatively connected with the at least one connector of the at least one flowmeter and adapted to receive data indicative of inlet and outlet temperatures measured by the thermal sensors.

20. The system of claim 19, wherein the data acquisition module is integrated to the flowmeter, and wherein the control module is further configured for receiving the data indicative of the inlet and the outlet temperatures from the data acquisition module.

21. The system of claim 20, further comprising a user interface configured for controlling the flowmeter via the control module and for data analysis of the data indicative of the inlet and outlet temperatures, the data analysis including a determination of air flow through the flowmeter duct.

\* \* \* \* \*